United States Patent
Michaelis et al.

(10) Patent No.: US 8,631,158 B1
(45) Date of Patent: Jan. 14, 2014

(54) LOCATION-BASED AUTOMATIC MODIFICATION OF A PORTABLE BROWSER'S HOME PAGE AND BOOKMARKS

(75) Inventors: Paul Roller Michaelis, Louisville, CO (US); David Scott Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 792 days.

(21) Appl. No.: 12/020,139

(22) Filed: Jan. 25, 2008

(51) Int. Cl.
*G06F 15/16* (2006.01)

(52) U.S. Cl.
USPC .......... 709/246; 709/203; 709/217; 709/223; 455/456.1; 455/456.2; 455/456.3; 455/456.4; 455/456.5; 455/456.6; 455/414.1; 705/14.1

(58) Field of Classification Search
USPC ................................ 709/223, 203, 217, 246; 455/456.1–456.6, 414.1
See application file for complete search history.

(56) References Cited

U.S. PATENT DOCUMENTS

| | | | | |
|---|---|---|---|---|
| 7,103,351 | B2 * | 9/2006 | Chaudhari et al. | 455/414.1 |
| 7,454,191 | B2 * | 11/2008 | Dawson et al. | 455/405 |
| 7,805,453 | B2 * | 9/2010 | Ostrover | 707/758 |
| 7,860,809 | B2 * | 12/2010 | Zellner | 705/58 |
| 2005/0243758 | A1 * | 11/2005 | Torarp et al. | 370/328 |
| 2005/0272443 | A1 * | 12/2005 | Hose et al. | 455/456.1 |
| 2006/0146820 | A1 | 7/2006 | Friedman et al. | |
| 2007/0191029 | A1 * | 8/2007 | Zarem et al. | 455/456.5 |
| 2008/0177858 | A1 * | 7/2008 | Aarnio et al. | 709/217 |
| 2009/0030792 | A1 * | 1/2009 | Khivesara et al. | 705/14 |
| 2009/0070873 | A1 * | 3/2009 | McAfee et al. | 726/23 |
| 2009/0177385 | A1 * | 7/2009 | Matas et al. | 701/209 |

OTHER PUBLICATIONS

"Homepage—Wikipedia, the free encyclopedia", available at http://en.wikipedia.org/wiki/Home_page, printed Dec. 27, 2007, 1 page.
"homepage—Wiktionary", available at http://en.wiktionary.org/wiki/homepage, printed Dec. 27, 2007, pp. 1-2.
"Bookmark—Wikipedia, the free encyclopedia", available at http://en.wikipedia.org/wiki/Bookmark, printed Dec. 27, 2007, 1 page.
"bookmark—Wiktionary", available at http://en.wiktionary.org/wiki/bookmark, printed Dec. 27, 2007, pp. 1-2.
Background of the Invention for the above-captioned application (previously provided).

* cited by examiner

*Primary Examiner* — Carl Colin
*Assistant Examiner* — Mohammad A Siddiqi
(74) *Attorney, Agent, or Firm* — Sheridan Ross P.C.

(57) ABSTRACT

A system is provided that includes: (a) a tracking module 140 operable to determine physical locations of subscribers and when a physical location of a selected subscriber has changed and (b) in response to a change in the physical location of the selected subscriber, a content provider 144 operable to select, from among a set of resource providers, a smaller set of resource providers of potential interest to the selected subscriber and provide to the selected subscriber's communication device resource provider content 134 associated with one or more members of the subset of resource providers.

15 Claims, 4 Drawing Sheets

LOCATION-BASED AUTOMATIC MODIFICATION OF A PORTABLE BROWSER'S HOME PAGE AND BOOKMARKS

FIELD OF THE INVENTION

The invention relates generally to information distribution architectures and particularly to location-based information distribution architectures.

BACKGROUND OF THE INVENTION

In the Internet, informational servers provide selected information to web browsers, which are typically associated with an individual. The browser may be configured by the individual to specify a homepage and save content links as bookmarks. A homepage or main page is the Universal Resource Locator (URL), or local file, that automatically loads when a web browser starts and when the browser's "home" button is activated. The term is also used to refer to the front page, webserver directory index, or main web page of a website. A bookmark is a pointer to a web page URL that acts as a shortcut by the web browser to access the web page.

Currently, an individual must proceed through a series of steps to access desired web content. For example, if an individual is in a store and would like to determine what products are on sale the individual would first search, using an Internet search tool such as Google™ or Yahoo™, for the main page of the store. From that URL, the individual would select appropriate hyperlinks to obtain the selected web page of interest. If the individual would like to comparison shop for a selected product, he or she would then access the main pages of competitors and obtain selected web pages reflecting the prices of the product. As can be seen from the example, the individual would perform a number of steps to obtain, from multiple competitors, comparable prices for the product.

The Internet does have search engines available to collect, from multiple vendors, prices for a selected product but these search engines still require multiple steps to be performed by the user. The user would, for example, need to locate the main page for the search engine and enter appropriate parameters for the search query.

Global Positioning System (GPS) and other location/presence-aware portable devices running Internet browser applications have been used to facilitate user access of web content. In one product, web content is pushed to the user as the user's physical location changes. For example, as the user walks down a street content, such as coupons and lunch menus, is pushed to the user's wireless communication device from spatially nearby vendors. However, the content pushed to the device is not based on personal preferences or a personal profile of the user.

In another context, set top boxes for cable TV networks can be used for electronic commerce. Under the Open Cable Application Platform Internet Protocol Multimedia Source (OCAPIMS) and Packet Cable protocols (now called Tru2way by the trade), personal information (e.g., apparel sizes, clothing preferences, socioeconomic profile, and the like) stored at a customer's set top box is used to filter and configure sales advertisements provided to the customer through the customer's television, autorecognize the customer when contacting the set top box from an external communication device, and provide the personal information to the customer via the external communication device.

There is a need for an automated network architecture for providing web content to a user based on the physical location of the user.

SUMMARY OF THE INVENTION

These and other needs are addressed by the various embodiments and configurations of the present invention. The present invention is directed to providing vendor content to potential customers using location information.

In a first embodiment, a method is provided that includes the steps:

(a) at a first time, determining, by a service provider, a first location of a user (who is a subscriber of the service provider) and/or a communication device associated with the user;

(b) based on the determined first location, selecting, by the service provider and from a larger group of resource providers, a first set of resource providers of potential interest to the user;

(c) providing, to the communication device for presentation to the user, first resource provider content associated with the selected members of the first resource provider set;

(d) at a second (later) time, determining, by the service provider, a second (different) location of the user and/or the communication device associated with the user;

(e) based on the determined second location, selecting, by the service provider and from the larger group of resource providers, a second set of resource providers of potential interest to the user, the memberships of the first and second resource provider sets being different; and (f) providing, to the communication device for presentation to the user, second resource provider content associated with the selected members of the second resource provider set.

The resource provider is an entity that provides one or more resources, such as information, a good, a service, a product, and the like to entities, such as business entities or persons. The resource provider can be, for example, a vendor, health care provider, government agency, and the like.

In a second embodiment, a method is provided that includes the steps:

(a) determining a first physical location of a user and/or a communication device associated with the user;

(b) determining that the first physical location corresponds to a location of a first resource provider; and (c) in response to step (b), performing one or both of the following sub-steps:

(C1) selecting, for presentation to the user by the user's communication device, resource provider content from the first resource provider based on the part of the business location corresponding to the first physical location; and (C2) selecting, for presentation to the user by the user's communication device, resource provider content from a second resource provider, the first and second resource providers being competitors.

The resource provider content can be in the form of a set of URLs, such as a web page. In one configuration, the service provider replaces temporarily the homepage of the subscriber's communication device with a resource provider homepage. In another configuration, the service provider provides the subscriber with a set of bookmarks, which are links to web pages of one or more resource providers. In either configuration, work and personal homepages and bookmarks of the subscriber are likely to be different from the resource provider content but still may be accessed via the browser application executing on the subscriber's communication device.

The various embodiments can provide a number of advantages depending on the particular configuration. For example, the service provider can provide automatically to a subscriber resource provider content of interest to the subscriber, including the prices of competitive products. This can be done automatically based on the location of the subscriber's communication device, without the subscriber manually and laboriously navigating through the Internet to access the websites of the resource providers. Because the subscriber's browser is populated automatically with homepages and bookmarks controlled by the service provider, the service provider charges resource providers a fee for including and preferentially sequencing bookmarks that are downloaded on the subscriber's device. Thus, the service provider can be funded primarily through advertising fees paid by the resource providers, and subscribers therefore can be charged, at most, a modest fee for participating in the service. To protect the subscriber's privacy, the subscriber can terminate the service at any time in his or her sole discretion.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
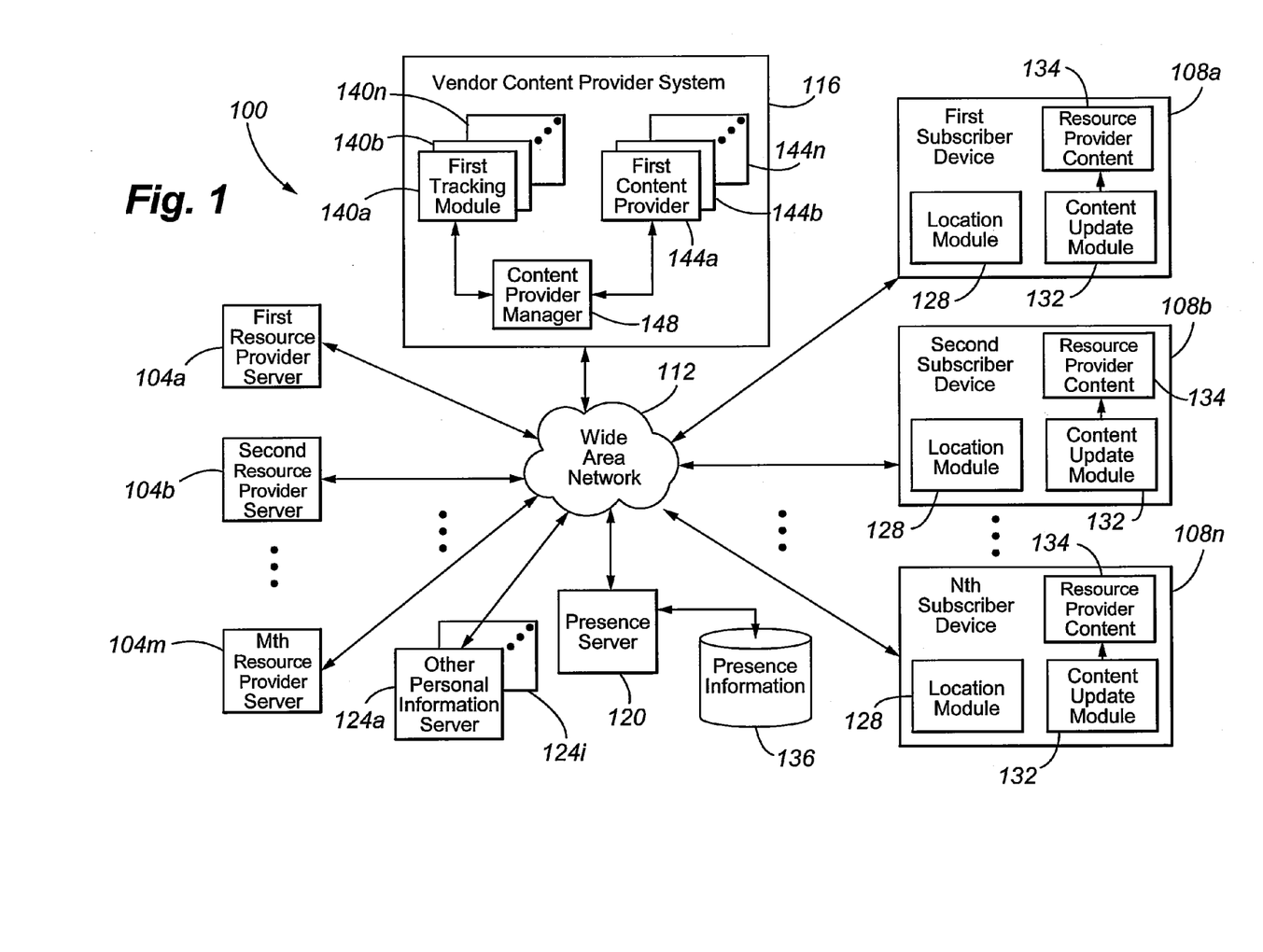
FIG. 1 is a block diagram depicting a network architecture according to an embodiment of the present invention.

FIG. 1 depicts a network architecture 100 according to an embodiment of the present invention. A plurality of first, second, . . . mth resource provider servers 104a-m are in communication with a plurality of first, second, . . . nth subscriber communication devices 108a-n (which correspond to customers and potential customers of the resource providers operating the resource provider servers) via a Wide Area Network (WAN) 112. Also in communication with the WAN are a presence server 120 and other personal information server(s) 124a-i and a resource provider content provider system 116. The resource provider content provider 116, using subscriber location, presence, and/or personal information, provides selected content from the first, second, . . . mth resource provider servers 104a-m to the first, second, . . . nth subscriber communication devices 108a-n. The resource provider content may be updated periodically or substantially continuously in response to location changes.

Each of the first, second, . . . mth resource provider servers 104a-m can be any suitable informational servers and corresponds to a different resource provider. The resource provider can provide retail or wholesale products and/or services. Exemplary resource providers include restaurants, retail stores, taxi and limousine services, beauty salons and barbershops, and the like.

The subscriber communication devices 108*a*-*n* are portable, wireless, text, voice, and/or video capable devices, such as Personal Digital Assistants (PDAs), laptops, personal computers, cellular phones, and the like. The devices 108*a*-*n* generally have a multimedia user interface, such as graphical display, for presenting selected resource provider content to the user.

Each of the subscriber communication devices 108 includes a location module 128 for determining a physical or spatial location of the respective subscriber communication device and a content update module 132 for updating periodically resource provider content 134 provided to or otherwise accessible by the user.

The location module 128 can determine location by any type of mechanism, such as by a Global Navigation Satellite System (GNSS) or other satellite navigation system (that provides autonomous geo-spatial positioning with global coverage), Radio Frequency Identification Detection (RFID) (with an RFID reader and tag being used to determine device location), and Internet connectivity via a connection, such as a wi-fi hot spot, controlled by a resource provider. As will be appreciated, GNSS allows small electronic receivers to determine their location (longitude, latitude, and altitude) to within a few meters using time signals transmitted along a line of sight by radio from satellites. Exemplary GNSS include the NAVSTAR Global Positioning System (GPS), the Russian GLONASS, the European Union's Galileo positioning system, the Chinese regional Beidou navigation system, and India's IRNSS.

The resource provider content 134 can be any suitable web content, such as a URL or set of URLs, and typically corresponds to a web page. The resource provider content 134 is typically in the form of an advertisement, solicitation, coupon, price discount, or other product or service descriptive information (e.g., product location in a store, transaction history, reviews by owners of the product, warranty information, and the like) provided by a resource provider to a selected subscriber. The resource provider content 134, in one configuration, is configured as a set of browser preferences, particularly a home page of the selected subscriber's device 108 and/or a transient or temporary set of bookmarks.

The WAN 112 is typically one or more packet-switched networks configured for any suitable communication protocol, such as the TCP/IP suite of protocols. In one configuration, the WAN 112 is a collection of wired and wireless networks, such as a wireless cellular network, a distributed processing network such as the Internet, and a cable television network.

The presence server 120 and attached presence information database 136 provide presence information respecting subscribers to other network components. The presence server 120 and presence information databases 136 collectively track the presence and/or availability of presence service subscribers and/or their communication devices and provide, to requesting entities, current presence information respecting selected presence service subscribers.

"Presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability (now being called presentity) include information regarding the accessibility of the endpoint device, the temporal (which refers to recency, duration, and/or frequency) use of the endpoint device by the person, temporal authentication by the person to a network component, temporal registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Presence information can be, for example, the electronic address of a device at which the service subscriber is currently deemed to be present and/or available.

Presence information can further include user preferences. User preferences, for example, include contact mode preferences or profiles such as the communication device to be contacted for specific types of contacts or under specified factual scenarios, contact time preferences, impermissible contact types and/or subjects such as subjects about which the person does not wish to be contacted, permissible contact type and/or subjects such as subjects about which the person does wish to be contacted, and contactors to be given preference or priority, or additional choices for the user's various communication endpoints and/or communication endpoint modes. For example, user preferences can include a buddy list much like instant messaging. User preferences permit a user to specify modes of communication based upon the time of day of communications, e.g., the user might accept a resource provider content on a cell phone during the day but not after hours. User preferences permit a user to select which medium of communication he or she wants to use or respond with, based upon a wide number of parameters.

The other personal information servers 124*a*-*i* can be any server providing personal information respecting a user of a subscriber device 108. Such servers can be, for example, a set top box associated with the user, a personal web site of the user, an employer's server, and one or more servers operated by one or more resource providers with which the user has had prior interactions. The personal information can be, for example, transaction (sales or service) history of a user, product or service preferences of the user, occupation of the user, financial profile of the user, cookies, and the like.

The resource provider content provider system 116 is one or more computational devices, such as a server or server farm, providing resource provider content 134 from one or more selected resource provider servers 104 to a selected subscriber device 108. To provide this functionality, the provider 116 includes, in memory, first, second, . . . tracking modules 140*a*-*n*, first, second, . . . nth content providers 144*a*-*n*, and a content provider manager 148. The first, second, . . . nth tracking modules 140*a*-*n* receive location signals from the location module 128 of a respective first, second, . . . nth subscriber device 108*a*-*n* indicating a current logical and/or physical location of the device, receive presence information from a presence server 120 associated with a user of the respective first, second, . . . nth subscriber device 108*a*-*n*, and/or personal information associated with a user of the respective first, second, . . . nth subscriber device 108*a*-*n* and determine if and when resource provider content 134 in the respective first, second, . . . nth subscriber device 108*a*-*n* is to be updated. The first, second, . . . nth content provider 144a-n, in response to an update signal generated by a corresponding first, second, . . . nth tracking module 140a-n, selects, according to predefined rules, a subset of the first, second, . . . mth resource provider servers 104a-m to query for resource provider content 134, obtains resource provider content 134 from each of the servers in the subset, and provides the retrieved resource provider content 134 to the respective first, second, . . . nth subscriber device 108a-n. Respective location, presence, and/or personal information can be used in selecting the subset of resource provider servers for each subscriber device. The content manager 148 processes subscription requests and acceptances and creates and terminates pairings of tracking modules 140 and content providers 144 as required by the terms of the subscription.

The business model of the resource provider content provider system 116 can be configured in many ways. In one business model, a user of a subscriber communication device subscribes to the resource provider content provider system 116 for a specified duration of time or for a specified geographical area or region. When the specified time expires or upon leaving the specified area or region, the subscription is automatically terminated or suspended. The user may or may not pay for the subscription. In one configuration, the user does not pay for the subscription, and the content update module 132 is downloaded to the user's subscription device as an applet. The resource provider content provider system 116 charges the resource providers associated with first, second, . . . mth resource provider servers 104a-m subscription and/or advertising fees in exchange for publishing their resource provider content to the first, second, . . . nth subscriber devices 108a-n. The system 116 could derive revenue by charging variable fees for including and preferentially ranking or sequencing the bookmarks that are downloaded to the device 108. In another business model, the provision of resource provider content to the devices 108 is turned on or off by the user by enabling/disabling functionality on the browser application of the subscriber device. The content update module 132 is offered as part of the browser application.

Examples of the operation of the resource provider content provider system 116 will now be discussed.

In a first example, a user visits a shopping mall with two department stores, namely Stores A and B. The user enters Store A. In response, the resource provider content provider system 116 would provide the homepage of Store A (www.departmentstoreA.com) to the user's portable communication device 108. The content update module 132 in the device would make the provided homepage the homepage of the device's browser application. Relevant bookmarks for other web pages in the website of Store A could be loaded automatically, such as a "search for item" or "ask about item" web page to permit the user to locate desired products or a "pay for an item" web page that is picked up at the customer check-out. The latter web page can be picked up by the customer checkout for later use at checkout in advance of the user checking out. This would permit the user to himself or herself scan or enter items in the cart. The file is then provided to a checkout station for quicker manual or automated check out. Service personnel could use any of these web pages to approach, assist, and/or cross-sell other products to the user while the user is still shopping. This would be made possible by Store A's resource provider server 104 providing the web page selections and field populations to the Store A outlet at which the user is located. In another configuration, if the subscriber communication device of the user includes a telephone function or instant messaging function, the resource provider content provider system 116 could provide a click-to-contact capability for each of the different departments in Store A.

In a second example, the resource provider content provider system 116 provides the user with the capability to comparison shop. In the example above, the system 116 would provide the user with the homepage of Store A because the user is located physically in Store A but provide the user with bookmarked web pages from both Stores A and B to enable the user to readily navigate through both Store A and B websites for competitive prices. In one configuration, the system 116 uses the search queries, product/service selections, and/or web page selections of the user on one of the websites to select and provide the user with similar content on the other website. For instance, if the user is searching Store A's website for men's dress shoes generally or a specific shoe type, design, or color, the system 116 could automatically provide the user with bookmarked web pages for the same or similar content on Store A's competitors' websites, which in the example is Store B's website. In one configuration, the user could use a tag reader on the communication device to scan a namespace, such as an RFID tag, bar code, or other identifier, on a selected product. The scanned namespace would be provided to the resource provider content provider system 116, which would use the scanned namespace to select resource provider content associated with the manufacturer of the scanned product and/or the scanned product itself and similar resource provider content from competitors.

The operation of the functional components involved in providing resource provider content to subscriber communication devices 108 will now be discussed with reference to FIGS. 2-4.

Figure 2:
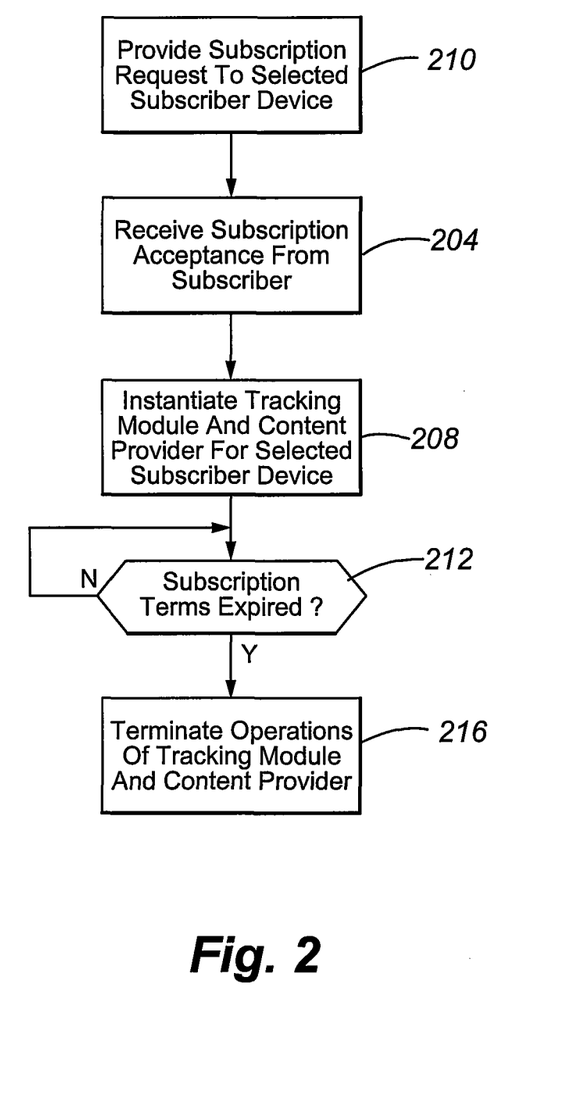
FIG. 2 is a flow chart according to an embodiment of the present invention.

Referring to FIG. 2, the content provider manager 148 provides, in step 200, a subscription request to the subscriber communication device. The subscription request is typically a web page including a number of fields, some of which may be pre-populated by the manager 148. The fields generally include a number of the identifier (e.g., electronic address or URL) of the subscriber communication device, the identity of the user (which may be a customer number or name and password), the length of time over which the subscription is to be enabled, the start time and end time for the subscription, the geographic region over which the subscription is to be enabled, the ability for the user to temporarily change their context and then later return to a previous context, and the like.

In step 204, the manager 148 receives and validates the completed subscription form (which is hereinafter referred to as the subscription acceptance form).

In step 208, the manager 148 authenticates the user and/or the user's communication device 108 and, if successfully authenticated, instantiates a pairing of a tracking module 140 and content provider 144 for the user's communication device 108. In one configuration, the module 140 and provider 144 are instantiated for the user rather than the device. This permits the system 116 to use the user's presence information for selective direction of resource provider content to different ones of the communication devices associated with the user, depending on the user preferences, device capabilities, and recent device activities (all of which are contained in the user's presence information).

In decision diamond 212, the manager 148 determines whether the subscription terms have expired or the subscription otherwise terminated. If not, the manager 148 periodically repeats decision diamond 212. If so, the manager 148 terminates the operations of the tracking module 140 and content provider 144 associated with the subscription.

Figure 3:
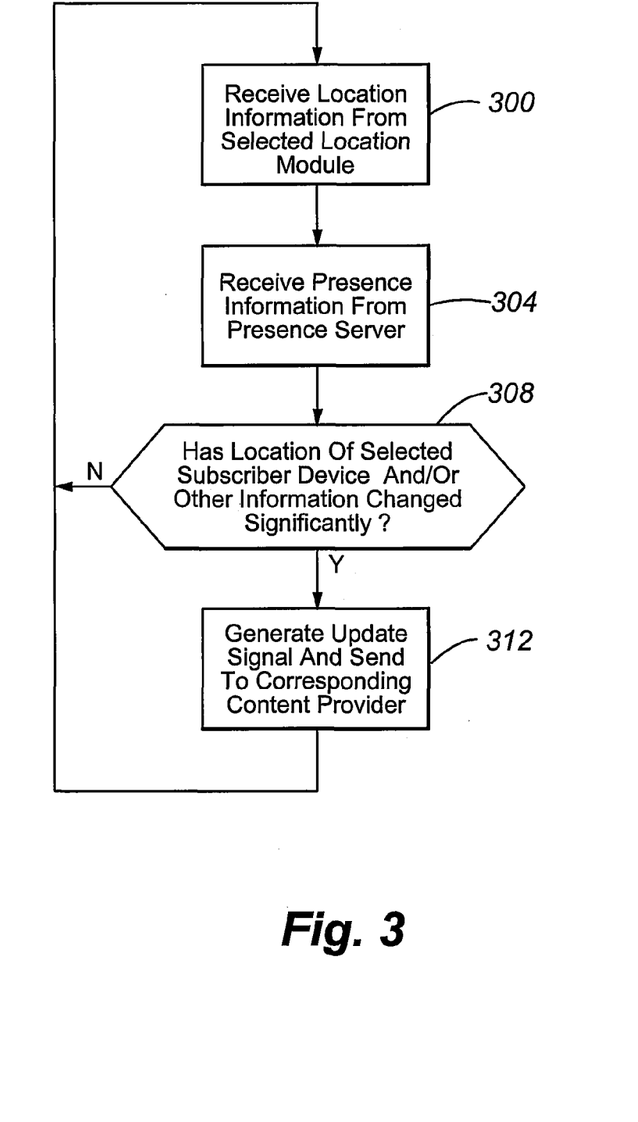
FIG. 3 is a flow chart according to an embodiment of the present invention.

Turning now to FIG. 3, a selected tracking module 140, in step 300, receives location information from a location module 128 in a selected communication device.

In step 304, the module 140 optionally obtains presence information from the presence server 120 of the presence service associated with the selected communication device or the user thereof. This step can be effected by a SUBSCRIBE request to the user's presence service, as defined by the Session Initiation Protocol (SIP).

In decision diamond 308, the module 140 determines whether the logical and/or physical location of the user or the user's communication device, as the case may be, has changed significantly. In one configuration, the module 140 determines whether the user has deactivated a communication device or started using another communication device. In either event, the user's logical location is deemed to have changed significantly. In one configuration, the selected module 140 determines whether the reported physical location of the module 128 has changed by at least a set threshold since the previously reported physical location of the module 128. In one configuration, the tracking module 140 maps the new physical location, which is in the form of GNSS coordinates, to a corresponding set of resource provider locations to determine what resource providers are nearby the user and/or, when the user is within a resource provider location, what part of the resource provider location the user is now in. When the user has moved to a different part of a store or has selected a new product for search or inspection, the module 140 may deem the physical location to have changed significantly.

When the logical and/or physical location has not changed significantly, the tracking module 140 returns to step 300.

When the logical and/or physical location has changed significantly, the tracking module 140, in step 312, generates and sends an update signal to content provider 144 assigned to service the selected communication device or user thereof. The tracking module 140 then returns to step 300.

Figure 4:
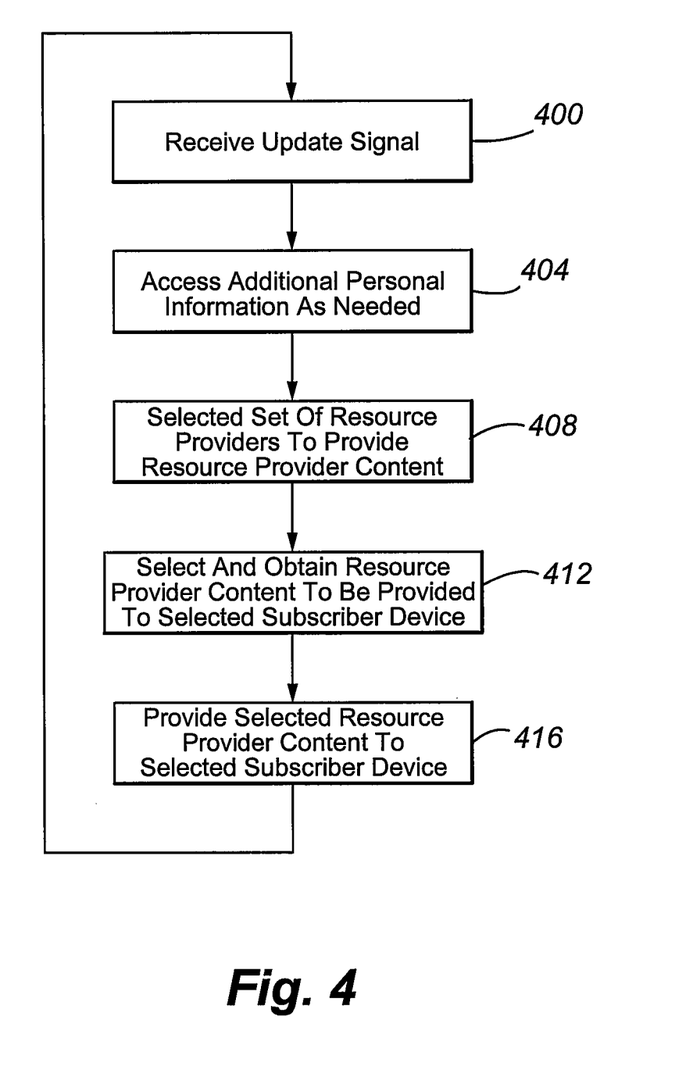
FIG. 4 is a flow chart according to an embodiment of the present invention.

Turning now to FIG. 4, the operation of the content providers will now be discussed.

In step 400, a selected content provider 144 receives an update signal from the corresponding tracking module 140. The update signal can include a timestamp and the current or new logical or physical location of the user (which location may be expressed as coordinates, a resource provider facility identifier, and/or an identifier of a part of a resource provider facility).

In step 404, the content provider 144 optionally obtains additional or current personal information from a personal information server 124, which may be the same as or otherwise associated with a resource provider server.

In step 408, the content provider 144 applies predetermined rules, and using the update signal fields, presence information, and/or personal information, selects a set of resource providers to provide resource provider content to the user.

In step 412, the content provider 144 selects and obtains resource provider content to be provided to the selected subscriber device 108.

In step 416, the content provider 144 forwards the retrieved resource provider content to the content update module 132 in the selected communication device 108.

The content update module 132 replaces the old resource provider content with the new resource provider content. Thus, the update module 132 may replace the browser preferences, such as by replacing the homepage with a new homepage associated with the new logical or physical location. When the resource provider content is a set of bookmarks, the content of a temporary bookmark file (e.g., a file such as tempbookmark.htm or a "temporary location-specific items" folder) is replaced with the new set of bookmarks or a new temporary bookmark file.

The user's normal, self-selected bookmarks, which may be configured as favorites, are generally not replaced by the temporary bookmark file. At any time during the subscription, the user may select between the normal (permanent) bookmarks or the temporary or transient bookmarks. When the subscription expires or is otherwise terminated, the homepage is returned to the user-selected homepage, and the temporary bookmark file is removed from memory. The user's normal, self-selected (permanent) bookmark file, however, is maintained or retained in memory.

In one configuration, the user's permanent bookmarks are not hidden or temporarily replaced. Instead, the temporary bookmarks are added to the user's pre-existing (permanent) list of bookmarks. The folder and/or the bookmarks it contains can be deleted manually by the user or automatically by the system 116, such as when the user changes location. Location-specific bookmarks that the user wishes to save can be transferred by the user from the temporary folder to the permanent bookmarks.

In one configuration, the system 116 maintains in memory the temporary bookmark files sent to the device 108 and provides the bookmark files or a selected bookmark file to the user at his or her request. This can be done by storing the bookmark files in a user account and permitting the user to browse the bookmark files and select which bookmarks or bookmark files the user wishes to download to this communication device 108.

The exemplary systems and methods of this invention have been described in relation to a wide area network for providing resource provider content to users. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a wireless phone or server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others For example, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A method, comprising:
at a first time, determining, by a service provider, a first location of at least one of a user or a communication device associated with the user;
based on the determined first location, selecting, by the service provider and from a larger group of resource providers, a first set of resource providers of potential interest to the user based on a proximity of the user to the first set of resource providers;

pushing, to the communication device for presentation to the user, first resource provider content associated with the selected members of the first resource provider set;

at a second time, determining, by the service provider, a second location of at least one of the user or the communication device associated with the user;

based on the determined second location, selecting, by the service provider and from the larger group of resource providers, a second set of resource providers of potential interest to the user based on a second proximity of the user to the second set of resource providers, the memberships of the first and second resource provider sets being different; and pushing, to the communication device for presentation to the user, second resource provider content associated with the selected members of the second resource provider set, wherein the user is a subscriber of the service provider; and wherein a first set of bookmarks is selected by the selected subscriber, wherein the first resource provider content comprises a second set of bookmarks, wherein the first and second set of bookmarks are both accessible by the selected subscriber at a common point in time, and wherein the second set of bookmarks is replaced by the service provider with a third set of bookmarks, included in the second resource provider content, when a physical location of the user changes to the second location;

wherein the first resource provider content comprises different resource provider content from first and second resource providers, the first and second resource providers are competitors, and the different resource provider content from the first and second resource providers relate to competitive products or services.

2. The method of claim 1, wherein the location is physical location, wherein the user's subscription is provided free of charge by the service provider, wherein the first and second resource provider content comprises Universal Resource Locators, and wherein the resource providers pay the service provider for providing resource provider content to potential customers.

3. The method of claim 1, wherein the resource provider content is at least one of a homepage of a selected resource provider in the subset of resource providers and a bookmark associated with the selected resource provider.

4. The method of claim 1, wherein the first and second resource provider content are different listings of bookmarks associated with one or more resource providers.

5. The method of claim 1, wherein the memberships of the first and second resource provider sets are selected based upon presence information associated with the user.

6. A tangible, non-transitory computer readable medium comprising processor-executable instructions operable to perform the steps of claim 1.

7. A method, wherein a user selects a first set of bookmarks, comprising:

determining a first physical location of at least one of the user and a communication device associated with the user;

determining that the first physical location corresponds to a business location of a first resource provider; and in response to determining that the first physical location corresponds to a business location, performing at least one of the following:

selecting, for presentation to the user, by the user's communication device, resource provider content from the first resource provider based on the part of the business location corresponding to the first physical location, wherein the first resource provider content includes a second set of bookmarks, wherein the first and second set of bookmarks are both accessible by the user at a common point in time, and wherein the second set of bookmarks are associated with the business location;

selecting, for presentation to the user, by the user's communication device, resource provider content from a second resource provider, the first and second resource providers being competitors;

determining a second physical location of at least one of the user and a communication device associated with the user; and in response to determining the second physical location, replacing the second set of bookmarks with a third set of bookmarks, wherein the first and third set of bookmarks are both accessible by the user at a second common point in time;

wherein the first resource provider content comprises different resource provider content from first and second resource providers, the first and second resource providers are competitors, and the different resource provider content from the first and second resource providers relate to competitive products and/or services.

8. The method of claim 7, wherein the steps are performed by a service provider, wherein the resource provider content comprises Universal Resource Locators, and wherein resource providers pay the service provider for providing resource provider content to potential customers.

9. The method of claim 7, wherein the resource provider content is at least one of a resource provider homepage and a bookmark associated with a selected resource provider.

10. A tangible, non-transitory computer readable medium comprising processor-executable instructions operated to perform the steps of claim 7.

11. A system, comprising:

a memory storing instructions;

a processor in communication with the memory, the processor executing the instructions stored in the memory, the instructions comprising:

a tracking module determining physical locations of subscribers and when a physical location of a selected subscriber has changed; and in response to a change in the physical location of the selected subscriber, a content provider to:

select, from among a set of resource providers, a smaller subset of resource providers of potential interest to the selected subscriber; and provide to the selected subscriber's communication device resource provider content associated with one or more members of the subset of resource providers;

wherein a first set of bookmarks is selected by the selected subscriber, wherein the resource provider content comprises a second set of bookmarks, wherein the first and second set of bookmarks are both accessible by the selected subscriber at a common point in time, and wherein the second set of bookmarks is replaced by the content provider with a third set of bookmarks when the physical location of the selected subscriber changes;

wherein the first resource provider content comprises different resource provider content from first and second resource providers, the first and second resource providers are competitors, and the different resource provider content from the first and second resource providers relate to competitive products or services.

12. The system of claim 11, wherein the selected subscriber's subscription is provided free of charge by the service provider, wherein the resource provider content comprises Universal Resource Locators, and wherein resource providers pay the service provider for providing resource provider content to subscribers.

13. The system of claim 11, wherein the resource provider content is at least one of a homepage of a selected resource provider in the subset of resource providers and a bookmark associated with the selected resource provider.

14. The system of claim 11, wherein the membership of the resource provider set is selected based upon presence information associated with the selected subscriber.

15. The system of claim 11, wherein the resource provider content is selected based upon presence information associated with the selected subscriber.

* * * * *